United States Patent [19]

Vasilos

[11] 4,209,560
[45] Jun. 24, 1980

[54] COMPOSITE STRUCTURE REINFORCED IN THE X, Y, AND Z DIRECTIONS AND METHOD OF MAKING SAME

[75] Inventor: Thomas Vasilos, Winthrop, Mass.

[73] Assignee: Avco Corporation, Wilmington, Mass.

[21] Appl. No.: 29,287

[22] Filed: Apr. 12, 1979

Related U.S. Application Data

[62] Division of Ser. No. 901,197, Apr. 28, 1978, Pat. No. 4,165,355.

[51] Int. Cl.² .................. C04B 35/76; C04B 35/80
[52] U.S. Cl. ..................................... 428/109; 428/114; 428/232; 428/294
[58] Field of Search ............... 428/107, 109, 114, 232, 428/294

[56] References Cited

U.S. PATENT DOCUMENTS

| | | | |
|---|---|---|---|
| 3,607,608 | 9/1971 | Siefert | 428/109 |
| 3,900,626 | 8/1975 | Brennan | 428/294 |
| 3,914,500 | 10/1975 | Brennan et al. | 428/295 |
| 4,001,478 | 1/1977 | King | 428/261 |
| 4,165,355 | 8/1979 | Vasilos | 264/60 |

Primary Examiner—James C. Cannon
Attorney, Agent, or Firm—Abraham Ogman

[57] ABSTRACT

A hot pressed composite structure, and method of making same are provided, wherein such structure is reinforced in three X, Y, and Z directions and comprises a matrix material, a plurality of straight elongate rigid reinforcing members embedded in the matrix material in spaced parallel relation and each disposed with its elongate dimension parallel to one of the above-mentioned directions, and a plurality of substantially straight elongate rigid reinforcing members embedded in the matrix material each with its elongate dimension disposed substantially along an associated one of the remaining two of the directions.

10 Claims, 5 Drawing Figures

COMPOSITE STRUCTURE REINFORCED IN THE X, Y, AND Z DIRECTIONS AND METHOD OF MAKING SAME

This is a division of application Ser. No. 901,197 filed Apr. 28, 1978 and now U.S. Pat. No. 4,165,355.

BACKGROUND OF THE INVENTION

1. Field of the Invention

This invention relates to a reinforced composite structure, and method of making same, and in particular to a hot pressed high temperature ceramic structure which is reinforced in three mutually perpendicular X, Y, and Z directions and is useable to make reinforced structures and components of all types which operate at temperatures which are sufficiently high to require use of ceramic materials.

2. Prior Art Statement

Hot pressed structures in the form of fused silica and methods of producing same have been proposed heretofore; and an example of such a structure is shown in U.S. Pat. No. 3,116,137. However, this patent does not teach or suggest a hot pressed composite structure which has precisely controlled reinforcement in three mutually perpendicular directions.

It has also been proposed to provide structures of solidified liquid synthetic plastic or resin which are reinforced by woven filaments to provide reinforcement for each structure in mutually perpendicular X, Y, and Z directions; and as disclosed in U.S. Pat. No. 4,001,478, for example. However, each of the structures disclosed in this patent is not in the form of a ceramic structure and thus is not useable at high temperatures requiring ceramic materials.

Accordingly, prior to this invention it was not known to provide a hot pressed composite structure and method of making same having integral reinforcement along three mutually perpendicular X, Y, and Z directions wherein such reinforcement renders the composite structure substantially isotropic.

SUMMARY OF THE INVENTION

It is a feature of this invention to provide a hot pressed composite structure which is reinforced by reinforcing members disposed in three mutually perpendicular X, Y, and Z directions.

Another feature of this invention is to provide a reinforced ceramic structure which is substantially isotropic.

Another feature of this invention is to provide a ceramic structure of the character mentioned which comprises a matrix material defined by a hot pressed powder consisting of particles ranging in size from one-half to ten microns wherein such particles have been fused to define such matrix material at a temperature ranging between 1450 and 1800 degrees Centigrade (C.) and pressures ranging between 250 and 3000 pounds per square inch gage (psig).

Another feature of this invention is to provide a structure of the character mentioned consisting of reinforcing members disposed in parallel layers extending in parallel X-Y planes parallel to X and Y directions and members extending in parallel relation in a Z direction and wherein such members extending in the Z direction may also be disposed in parallel layers.

Another feature of this invention is to provide an improved punch which enables making a hot pressed ceramic structure of the character mentioned.

Another feature of this invention is to provide an improved method of making a composite structure of the character mentioned.

Another feature of this invention is to provide an improved method of making a structure of the character mentioned employing at least one of the above-mentioned punches wherein such punch allows reinforcing members comprising the structure being formed to move within the punch in an unobstructed manner during forming of such structure.

Therefore, it is an object of this invention to provide a reinforced composite structure, preferably a ceramic, structure and apparatus and method for making same having one or more of the novel features set forth above or hereinafter shown or described.

Other objects, features, details, uses, and advantages of this invention will become apparent from the embodiments thereof presented in the following specification, claims, and drawing.

BRIEF DESCRIPTION OF THE DRAWING

The accompanying drawing shows present preferred embodiments of this invention, in which.

DESCRIPTION OF ILLUSTRATED EMBODIMENTS

Figure 1:
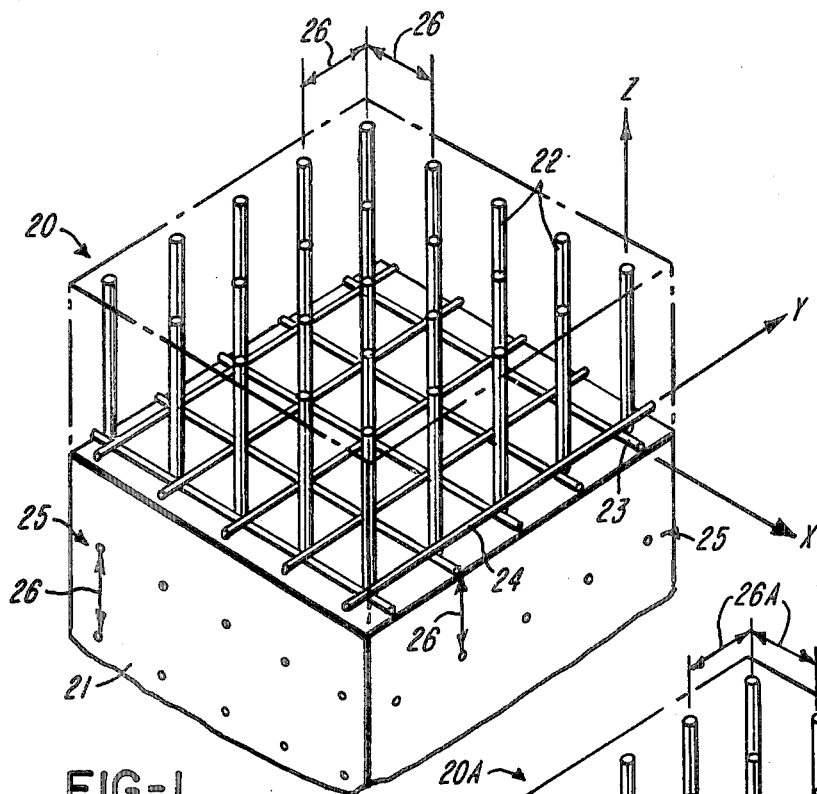
FIG. 1 is a perspective view with parts in elevation and parts broken away illustrating one exemplary embodiment of the ceramic structure of this invention.

Reference is now made to FIG. 1 of the drawing which illustrates an exemplary embodiment of a hot pressed ceramic structure of this invention which is designated generally by the reference numeral 20 and such reference to hot pressed structure is intended to define that structure 20 has been made by hot pressing techniques and as will be described in more detail subsequently. The ceramic structure is reinforced in three directions identified in the drawing as an X direction, a Y direction, and a Z direction by corresponding arrows X, Y, and Z. In the drawing the three directions are mutually perpendicular. This is not a limitation on the process. Generally X, Y, and Z form a three-dimensional geometric axis system.

In addition to the exemplary ceramic material, the matrix material may be material that is capable of being sintered or more generally densified by plastic flow. For example, a composite structure having a nickel matrix was formed. The nickel underwent considerable flow when pressed, but the end result was an isotropic composite structure.

The ceramic structure 20 comprises a ceramic matrix material 21 which has integral reinforcing means comprising a plurality of straight elongate reinforcing members 22 embedded in the matrix material 21 in parallel relation and each disposed with its elongate dimension parallel to the Z direction. The reinforcing means of the ceramic structure 20 also comprises a plurality of substantially straight elongate reinforcing members 23 embedded in the matrix material 21 and each disposed with its elongate dimension substantially along the X direction, and a plurality of substantially straight elongate reinforcing members 24 embedded in the matrix material 21 and each also disposed with its elongate dimension substantially along the Y direction.

The reference to each member 23 and 24 being disposed with its elongate dimension substantially along X and Y directions respectively is not intended to highlight that such members need necessarily be parallel to their associated directions. These members may range from roughly 45° to parallel relative to axis X or Y. The members, along a particular direction, X or Y, need not be parallel to each other.

However, the members 23 are preferably disposed in parallel relation and parallel to the X direction; and the members 24 are also preferably disposed in parallel relation and parallel to the Y direction. Further, for ease of presentation the members 22, 23, and 24 may also be referred to hereinafter as Z members, X members, and Y members, respectively.

In the structure 20 the members 23 and 24 are disposed in the matrix material 21 in a plurality of parallel layers with each layer being designated by the reference numeral 25. Each layer 25 is comprised of a plurality of parallel equally spaced X members 23 adjoined by Y members 24 whereby each layer 25 is a substantially planar layer and the planar layers 25 are disposed in equally spaced parallel relation along the Z direction with a center spacing 26 therebetween which may range from zero where adjacent layers 25 are touching to between 0.10 inch and 0.15 inch for the exemplary size members 23 and 24 to be subsequently described. The Z members 22 are also preferably disposed with the above-identified center spacing 26 between members in the X direction and essentially the same center spacing 26 between members disposed along the Y direction whereby the Z members 22 may also be considered as disposed in mutually perpendicular parallel layers.

It will also be seen that in this example X members 23 are disposed in paralled relation against an associated set of Z members 22 whereby the spacing between centers of the X members 23 is, in essence, center spacing 26. Similarly, the Y members 24 are also disposed in parallel relation against an associated set of Z members 22 whereby the Y members 24 also have center spacing 26 therebetween.

The structure 20 is made by hot pressing, i.e., while simultaneously applying an elevated temperature and pressure, a suitable powdery material having a particle size ranging between roughly one-half micron and ten microns with the preferred size being generally of the order of five microns. The material which is employed may be any suitable material which can be pressed and sintered. For ceramics the pressing temperature ranges between 1450° C. and 1800° C. (with the preferred temperature range being between 1550° C. and 1600° C.) while being subjected simultaneously to a pressure which may range between 250 psig and 3000 psig, depending on the particle size and specific material. Typical materials or powders which may be employed include powders consisting of sialon or Si, Al, O, N compositions, silicon nitride, silicon nitride-carbon, and tantalum carbide. Nickel and thermoplastic plastics are other suitable materials.

The reinforcing members 22 which are disposed in parallel relation to the Z direction are preferably substantially identical and of circular cross section and such members may have a diameter ranging between 0.030 and 0.100 inch. With members 22 having a diameter within the range of 0.030 inch and 0.045 inch, the spacing 26 therebetween is preferably generally of the order of 0.125 inch.

The X members 23 and Y members 24 are preferably substantially identical and also of circular cross section and such members may have a diameter ranging between 0.015 inch and 0.030 inch. In this example the members 23 and 24 are shown as being of smaller diameter than members 22 although members 23–24 may, in some applications, be equal to or larger than members 22. Further, with the disposal of parallel X members 23 against an associated set of Z members 22 as described earlier, the spacing between X members is also generally of the order of 0.125 inch. Likewise, with the disposal of parallel Y member 24 against an associated set of Z members 22 as described earlier, the spacing between Y members is also generally of the order of 0.125 inch.

The members 22, 23, and 24 may be made of any suitable high temperature material which is compatible with the powder material previously described and used to define matrix 21. Further the material used to define members 22, 23, and 24 should retain its structural integrity during forming a matrix 21 while bonding thereto in a tenacious manner. Preferably the members 22, 23, and 24 are made of materials consisting primarily of molybdenum, tantalum, tungsten, and graphite.

Figure 2:
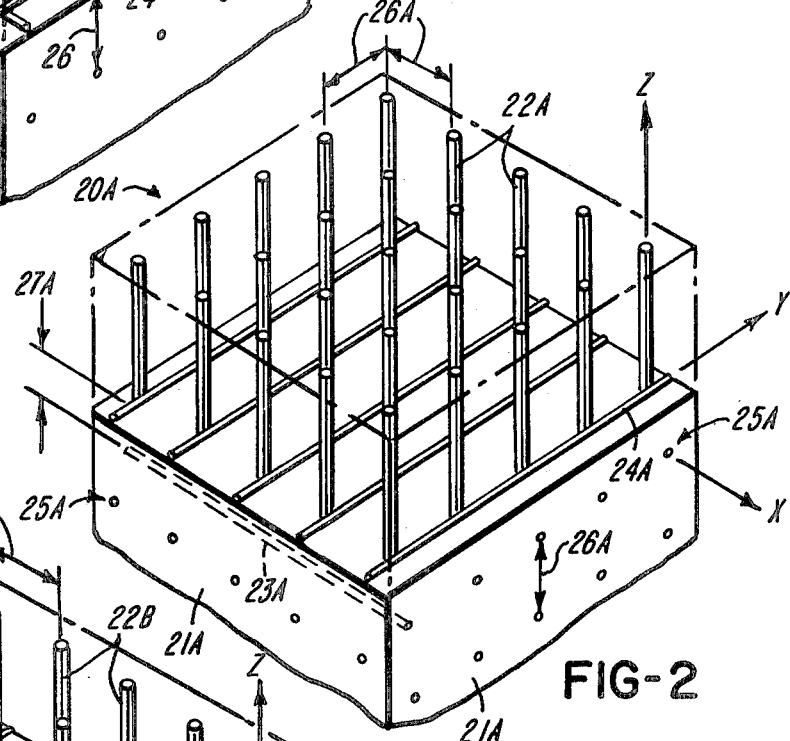
FIG. 2 is a view similar to FIG. 1 illustrating another exemplary embodiment of the structure of this invention.
Figure 3:
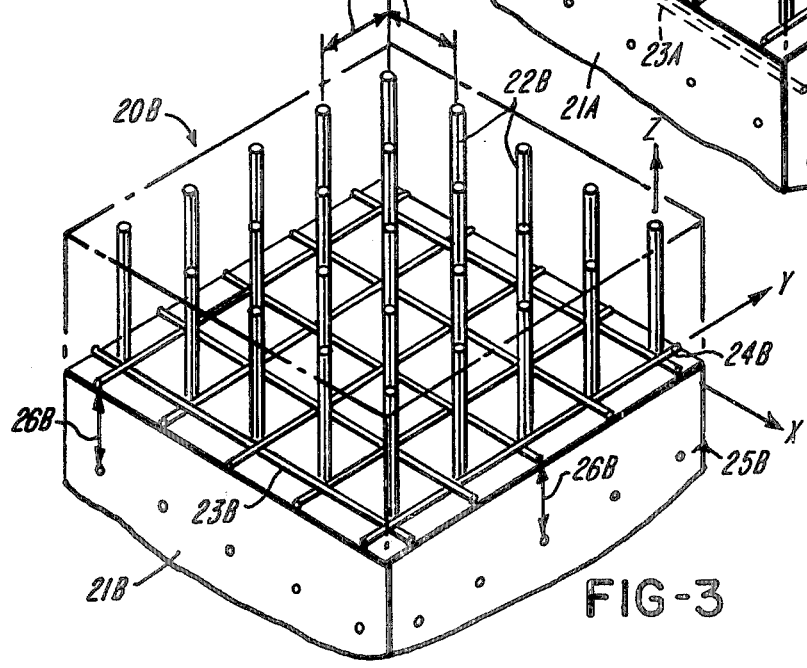
FIG. 3 is a view similar to FIG. 1 illustrating another exemplary embodiment of the structure of this invention.

Other exemplary embodiments of the hot pressed ceramic structure of this invention are illustrated in FIGS. 2 and 3 of the drawing. The structures illustrated in FIGS. 2 and 3 are similar to structure 20; therefore, such structures will be designated by the reference numerals 20A and 20B, respectively, and representative parts of such structures which are similar to corresponding parts of the structure 20 will be designated in the drawings by the same reference numerals as in the structure 20 (whether or not such components are mentioned in the specification) followed by an associated letter designation either A or B and not described again in detail.

In the structure 20A of FIG. 2 a matrix material 21A is defined in a similar manner as matrix 21 of structure 20 and the Z members 22A also similarly provided with spacing 26A therebetween. The main difference between the structure 20A and the structure 20 is that each X member 23A is disposed in an associated planar layer 25A spaced from Y members and each Y member 24A is disposed in an associated planar layer also designated 25A spaced from X members. The spacing in the Z direction between a layer 25A of X members 23A and an immediately adjacent layer 25A of Y members 24A is indicated as a center spacing 27A which is roughly ½ the center spacing 26A of the Z members 22A. Also the same center spacing 26A is provided between immediately adjacent layers 25A of X members 23A and immediately adjacent layers 25A of Y members 24A.

In the structure 20B of FIG. 3, a matrix 21B is similarly defined as matrix 21 of structure 20 and the Z members 22B are similarly provided with a spacing 26B therebetween. The main difference between the structure 20B and the structure 20 is that the X members 23B and the Y members 24B are formed in an associated layer 25B thereof in what may be considered a woven construction. Accordingly, associated members 23B and 24B, in essence, define warps and wefts of a square-woven construction which defines an associated layer 25B. The layers 25B are disposed in parallel relation in the Z direction with equal spacing 26B therebetween.

Figure 4:
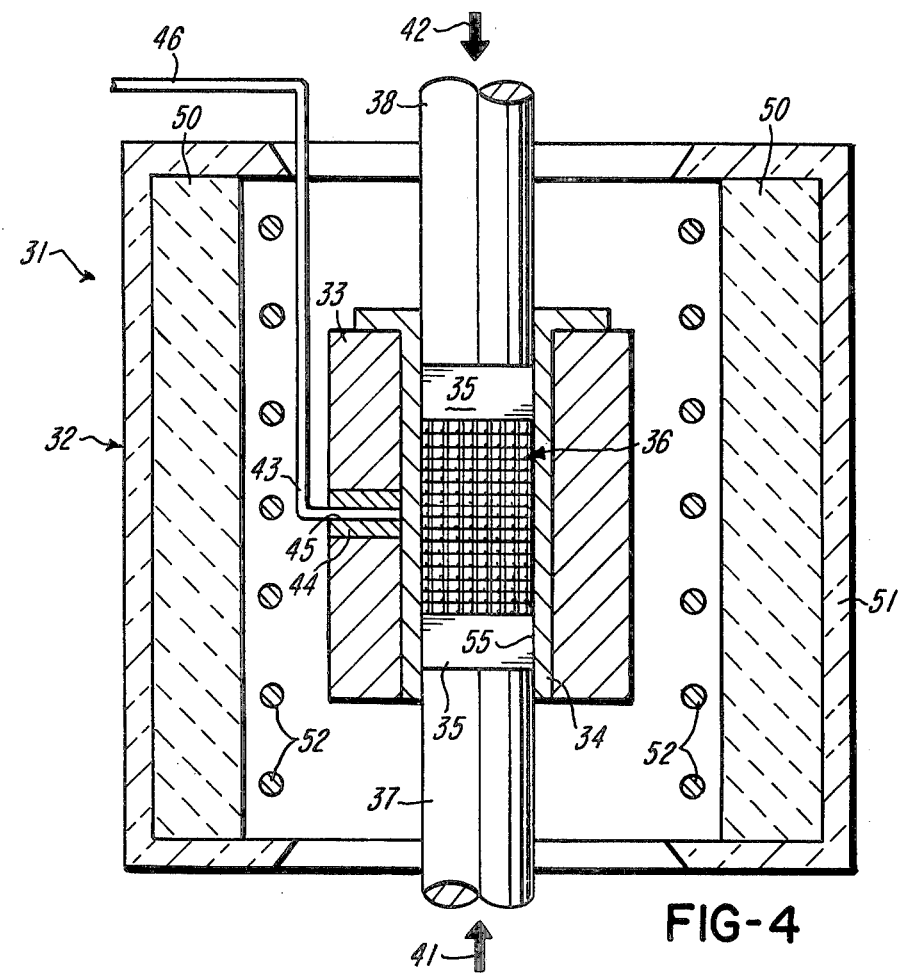
FIG. 4 is a view with parts in elevation, parts in cross section, and parts shown schematically illustrating an exemplary apparatus and method employed in making the ceramic structure of this invention.

Each of the ceramic structures 20, 20A, and 20B may be made employing any suitable apparatus and method known in the art; however, each structure is preferably made employing method steps essentially as disclosed by the apparatus and method 31 illustrated in FIG. 4. For ease of presentation the description will now proceed with a description of the apparatus and method employed in making the ceramic structure 20 with it being understood that similar method steps would be employed in making structures 20A and 20B.

In carrying out the method 31 a hot pressing apparatus 32, which is suitably supported and provided with electric power, is employed. The apparatus 32 comprises a die body 33 which is made of a suitable material such as graphite and the die body supports a graphite sleeve-like container or sleeve 34 and a pair of cooperating punches 35. The sleeve 34 and punches 35 are used as will be described in detail subsequently and an assembly 36 of components (to be described subsequently) is disposed in sleeve 34 between punches and such assembly 36 is hot pressed to define ceramic structure 20.

The apparatus 32 also comprises a pair of relatively vertically movable graphite rams 37 and 38 which are movable by moving means 41 and 42, respectively, of an associated press; and for ease of presentation, the moving means 41 and 42 are shown schematically by arrows.

To enable control of the temperature to which the assembly 36 is subjected, a thermocouple 43 or optical pyrometer is provided and extends through a thermocouple support structure 44 disposed within a recess 45 of the die body 33. The thermocouple 43 has an outer end portion 46 suitably connected to a temperature indicating device (not shown) of any suitable type known in the art.

The die body 33 is surrounded by refractory alumina 50 which, in turn, is surrounded by suitable insulation which may be in the form of quartz insulation 51. The apparatus 32 also comprises a suitable induction or electric heater 52 which in this example is shown in the form of a resistance heater. The die body 33 as surrounded by refractory alumina 50, quartz insulation 51, and heater 52, in essence, define a high-temperature electric furnace portion of the hot pressing apparatus 32.

The graphite sleeve 34 has an outside surface which in this example is a right circular cylindrical surface and sleeve 34 has an inside surface 55 of substantially rectangular cross-sectional configuration which is particularly adapted to receive the assembly 36 and punches 35 therewithin.

Figure 5:
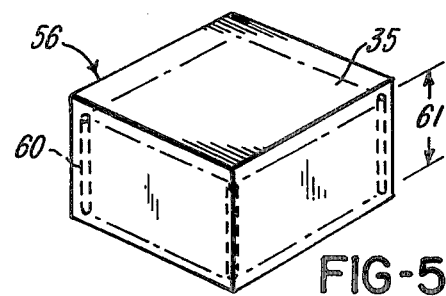
FIG. 5 is a perspective view illustrating a typical punch comprising the apparatus of FIG. 4 and employed in carrying out the method of this invention.

Reference is now made to FIG. 5 of the drawing which illustrates a typical one of the substantially identical punches 35. The punch 35 is in the shape of a rectangular parallelepiped whereby each punch 35 has a rectangular cross-sectional outline 56 which is dimensioned such that it is readily easily slidably moved along the inside surface 55 of the sleeve 34. The punch 35 has a plurality of parallel blind bores each designated by the same reference numeral 60 disposed in parallel relation therewithin and each bore 60 is particularly adapted to slidably receive an associated reinforcing Z member 22 therewithin. The diameter of each bore 60 and depth 61 thereof within the graphite punch 35 are such that with the assembly 36 of components within the sleeve 34 and the punches 35 in position on opposite sides of the assembly 36 a powder material (as identified earlier) comprising the ceramic structure 20 may be hot pressed to define the ceramic structure 20. The depth or dimension 61 is such that the members 22 will not bottom out and substantial space remains after powder compression that there will be no buckling of the Z members 22. This technique allows hot pressing with axial sliding movement of punches 35 relative to the reinforcing Z members 22 without imposing stresses thereon and in a manner heretofore unknown. After the ceramic structure 20 is formed the Z members 23 extending outwardly of opposite ends of the matrix 21 are machined or otherwise cut away so that the matrix is reinforced to its peripheral surfaces.

Having described several examplary embodiments 20, 20A, and 20B of the hot pressed ceramic structure of this invention and apparatus and method 31 illustrated in FIG. 4 which may be employed in making each embodiment of such ceramic structure, the disclosure will now proceed with a description of typical exemplary method steps which may be employed in defining the unique ceramic structure of this invention.

In particular, in carrying out the method 31 of this invention a lower graphite punch 35 is disposed within the graphite sleeve 34 of the die body 33 with the parallel identical bores 60 thereof opening upwardly and parallel to the Z direction. Identical elongate rigid reinforcing Z members 22 are inserted in the bores 60 whereby such members are supported in parallel relation and parallel to the Z direction. A first controlled thickness of a high temperature powder material having a particle size ranging between $\frac{1}{2}$ and 10 microns and consisting of any one of sialon or sial composition, silicon nitride, silicon nitride-carbon, or tantalum carbide is then provided along the Z members. A plurality of substantially straight elongate rigid reinforcing X members and Y members are then disposed on the first thickness of powder material with each of the X and Y members being disposed parallel to an associated one of an X and Y directions and for this exemplary presentation of the method the X and Y members are disposed in contact with each other defining a layer 25 thereof. As previously indicated, the X, Y, and Z directions are mutually perpendicular.

A second controlled thickness of the previously described high temperature powder material is then disposed on the layer 25 of X and Y members and the first and second thicknesses of the powder of this example are identical. Additional layers 25 of X and Y members may then be alternated with additional thicknesses of powder material each of identical thickness to the first and second thicknesses until the desired number of alternating layers 25 and thicknesses of powder material are provided. An upper graphite punch 35 is then disposed with the Z members 22 received within its bores 60 thereby defining the assembly 36 within the sleeve 34.

It will be appreciated as previously indicated that the reinforcing members 22, 23, and 24 are of any size as described earlier and may be made of a material consisting primarily of molybdenum, tantalum, tungsten, or graphite as previously described.

The powder material and members 22, 23, and 24 are then hot pressed employing the apparatus 32 applying controlled heat and pressure while exerting pressure parallel to the Z members 22 employing the punches 35 which compact the powder yet such punches slide relative to the Z members 22 to define a hot pressed structure consisting of the powder material which has beem substantially compacted by the punches 35 and fused to define the matrix 21 which has the reinforcing members 22, 23, and 24 embedded therein to thus define the ceramic structure 20. The pressure during hot pressing is within the range 250 psig and 3000 psig and the temperature is within the range 1450° C. to 1800° C. as previously described. It will be appreciated that the pressure is applied using the graphite punches 35 which are engaged by the rams 37 and 38 which are, in turn, moved by respective associated moving means 41 and 42.

It will be appreciated that this technique results in providing the structure 20; however, the steps in which the X members and Y members are stacked or disposed to define assembly 36 may be modified as required to define the ceramic structures 20A and 20B.

It will be appreciated that any suitable technique may be employed for disposing the powder in position to define assembly 36 and the above description has been made for ease of presentation and need not necessarily be followed exactly. In addition, it will be appreciated as indicated earlier that the amount of powder in each layer and hence each thickness thereof will vary. Further, the amount that the powder is compressed to define matrix 21 may be any amount whereby the powder may be compressed to ⅓ to 1/5 of its original thickness to define what will be referred to as a compression ratio of 3:1 to 5:1, depending on the compressibility of the matrix material.

However, regardless of the amount that the powder is compressed to define the matrix 21, the height 61 of the bores 60 in each punch 35 and hence the overall height of each punch 35 is controlled so that with compression of the powder, the Z members 22 may slide within their bores 60 without bottoming out and without columnar loads thereon.

In this disclosure of the invention, the assembly 36 is compressed employing a plurality of two punches 35; however, it is to be understood that a single punch may be employed in some applications of this invention. In addition, it will be appreciated that one or more punches similar to punch 35 may be provided with bores 60 extending completely therethrough in which case associated bearing members may be required to transmit compressive forces from the members 37 and 38 to such punches as desired. In any event the compressing action is achieved without applying compressive loads on the Z members.

From the above description, it is seen that a technique is provided in which elongate rigid reinforcing members may be disposed in three mutually perpendicular directions and a hot pressed ceramic matrix formed therearound employing ceramic materials and in a manner heretofore unknown.

While present exemplary embodiments of this invention, and methods of practicing the same have been illustrated and described, it will be recognized that this invention may be otherwise variously embodied and practiced within the scope of the following claims:

I claim:

1. A hot pressed composite structure reinforced in three directions—X, Y, and Z—comprising:
   a matrix having a pressed and sintered structure;
   a plurality of elongate reinforcing members embedded in said matrix in a parallel relation defining one of said directions X, a plurality of second elongate reinforcing members embedded in said matrix in a parallel relation defining a second of said directions Y, a plurality of third elongate reinforcing members embedded within said matrix in a parallel relation defining a third of said directions Z, said directions X, Y, and Z being angularly displaced relative to one another defining a three dimensional geometric axis system.

2. A structure as set forth in claim 1 in which said one direction is said Z direction with the members associated therewith being Z members which are equally spaced apart, said remaining two directions are X and Y directions with the members associated therewith being X members and Y members, respectively, each of said X and Y members being disposed with its elongate dimension parallel to its associated direction with the X members being equally spaced apart and the Y members being equally spaced apart, said members being disposed along mutually perpendicular X, Y, and Z directions.

3. A structure as set forth in claim 2 in which said X members and Y members adjoin each other and define a layer thereof.

4. A structure as set forth in claim 2 in which said X members are disposed in one planar layer perpendicular to said Z direction and said Y members are disposed in another planar layer also perpendicular to said Z direction, said planar layers being in spaced relation along said Z direction.

5. A structure as set forth in claim 2 in which said X members and Y members adjoin each other in a woven arrangement and define a layer thereof.

6. A structure as set forth in claim 2 in which said matrix material is defined of a hot pressed powder ranging in particle size from ½ micron to 10 microns and the powder particles have been pressed and sintered to define said matrix at a temperature ranging between 1450° C. and 1800° C. and a pressure ranging between 250 psig and 3000 psig.

7. A structure as set forth in claim 6 in which each of said Z members has a diameter of at least 0.030 inch.

8. A structure as set forth in claim 6 in which each of said X and Y members has a diameter ranging between 0.015 inch and 0.030 inch.

9. A structure as set forth in claim 6 in which said powder and matrix material is a material from the group consisting of a sialon composition, silicon nitride, silicon nitride-carbon and tantalum carbide.

10. A structure as set forth in claim 6 in which each of said members is made of a material from the group consisting primarily of molybdenum, tantalum, tungsten, and graphite.

* * * * *